(12) United States Patent
Hoeger

(10) Patent No.: US 11,801,482 B2
(45) Date of Patent: Oct. 31, 2023

(54) MIXING FLUIDS IN WELDING-TYPE EQUIPMENT

(71) Applicant: ILLINOIS TOOL WORKS INC., Glenview, IL (US)

(72) Inventor: Michael Vincent Hoeger, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 53 days.

(21) Appl. No.: 17/177,861

(22) Filed: Feb. 17, 2021

(65) Prior Publication Data

US 2022/0258105 A1 Aug. 18, 2022

(51) Int. Cl.
*B01F 23/10* (2022.01)
*B01F 35/21* (2022.01)
*B23K 9/095* (2006.01)
*B23K 9/16* (2006.01)

(52) U.S. Cl.
CPC ........ *B01F 23/191* (2022.01); *B01F 35/2111* (2022.01); *B23K 9/0953* (2013.01); *B23K 9/0956* (2013.01); *B23K 9/164* (2013.01)

(58) Field of Classification Search
CPC .... B23K 9/0953; B23K 9/0956; B23K 9/325; B01F 35/2111
See application file for complete search history.

(56) References Cited

U.S. PATENT DOCUMENTS

| | | |
|---|---|---|
| 3,791,813 A | 2/1974 | Ramachandran |
| 4,749,841 A | 6/1988 | Galantino |
| 4,871,898 A | 10/1989 | Cherne |
| 5,291,423 A | 3/1994 | Roeoesli |
| 6,178,997 B1 | 1/2001 | Adams |
| 6,479,793 B1 | 11/2002 | Wittmann |
| 7,552,731 B2 | 6/2009 | Jorczak |
| 8,129,652 B2 | 3/2012 | Hampton |
| 8,651,137 B2 | 2/2014 | Keffer |
| 8,754,348 B2 | 6/2014 | Salsich |
| 9,690,304 B2 | 6/2017 | Downie |

(Continued)

FOREIGN PATENT DOCUMENTS

| | | |
|---|---|---|
| AU | 2018100195 | 3/2018 |
| CN | 1200060 | 11/1998 |

(Continued)

OTHER PUBLICATIONS

Bush, Steve; "Smart IoT valve allows remote gas cylinder management," Electronics Weekly com., Jan. 18, 2018, 3 pages.
Siemens World Wide; "SITRANS P280" Siemens Industry Mall, https://maill.undustry.siemens.com/mall/en/WW/Catalog/Products/10069488, retreived Feb. 18, 2020, 1 page.
Pietro Fiorentini S.p.a.; "Smart Gas Grids—FIO2 Gas Pressure Regulator Smart add-on" 2015, retrieved on Feb. 26, 2020, 6 pages.
Pietro Fiorentini S.p.a.; "FIO 2.2 Smart add-on for gas pressure Regulators," 2015, retreived on Feb. 26, 2020, 12 pages.

(Continued)

*Primary Examiner* — Matthew W Jellett
(74) *Attorney, Agent, or Firm* — McAndrews, Held & Malloy, Ltd.

(57) ABSTRACT

Methods and apparatus are disclosed relating to mixing fluids in welding-type equipment. In some examples, a welding-type power supply (and/or wire feeder) may include multiple fluid paths through which to provide fluid from multiple fluid reservoirs to multiple welding-type tools. The power supply may be configured to automatically control fluid flow rates through the fluid paths via proportional valves. Further, the welding-type power supply may be configured to allow and/or prohibit mixing of fluids from different flow paths via control of various valves.

20 Claims, 4 Drawing Sheets

(56) References Cited

U.S. PATENT DOCUMENTS

| | | | |
|---|---|---|---|
| 10,150,175 B2 * | 12/2018 | Nacey | B23K 10/02 |
| 10,672,967 B2 | 6/2020 | Denis | |
| 2003/0213520 A1 | 11/2003 | Prinz | |
| 2005/0039804 A1 | 2/2005 | Kim | |
| 2007/0051703 A1 | 3/2007 | Neff | |
| 2008/0053965 A1 | 3/2008 | Laymon | |
| 2009/0107960 A1 | 4/2009 | Hampton | |
| 2009/0152251 A1 | 6/2009 | Dantinne | |
| 2012/0255988 A1 | 10/2012 | Perry | |
| 2013/0112660 A1 | 5/2013 | Enyedy | |
| 2014/0097165 A1 | 4/2014 | Leisner | |
| 2014/0374396 A1 | 12/2014 | Luo et al. | |
| 2015/0027998 A1 | 1/2015 | Brine et al. | |
| 2016/0059341 A1 | 3/2016 | Peters | |
| 2016/0136764 A1 | 5/2016 | Enyedy | |
| 2016/0263691 A1 | 9/2016 | Smith | |
| 2017/0165775 A1 | 6/2017 | Knoener | |
| 2017/0216954 A1 | 8/2017 | Blankman | |
| 2018/0031152 A1 | 2/2018 | Rajagopalan | |
| 2018/0043456 A1 | 2/2018 | Hoeger | |
| 2018/0290229 A1 | 10/2018 | Wada | |
| 2019/0302811 A1 | 10/2019 | Bragg | |

FOREIGN PATENT DOCUMENTS

| | | |
|---|---|---|
| CN | 101214584 | 7/2008 |
| EP | 0331062 | 9/1989 |
| EP | 0854006 | 7/1998 |
| JP | S63240930 | 10/1988 |
| JP | 01186281 | 7/1989 |
| JP | 2005177822 | 7/2005 |
| JP | 2019051546 | 4/2019 |
| TW | 200920537 | 5/2009 |
| WO | 2013051178 | 4/2013 |
| WO | 2015047770 | 4/2015 |
| WO | 2019170289 | 9/2019 |
| WO | 2019170289 A1 | 9/2019 |

OTHER PUBLICATIONS

"Welding Handbook, Chapter 4—Gas Metal Arc Welding ED", O'Brien, Jan. 1, 2004, Welding Handbook Processes, vol. 2, Welding Processes, Part 1, American Welding Society, p. 178, right hand col. paragraphs 1-2.

International Search Report and Written Opinion for PCT/US2017/046700, dated Nov. 22, 2017, 20 pages.

Environics, Series 3000 Gas Blending-Gas Delivery System, https://www.environics.com/products/gas-blending-gas-delivery-systems/, 5 pages, retreived Jan. 5, 2021.

SuperFlash, Fully customize and mix your gases!, https://oxyfuelsafety.com/fully-customize-and-mix-your-gases, Mar. 18, 2015, 7 pages.

Binzel-Abicor, EWR 2 / EWR 2 Net Gas Monitoring System, retreived from https://www.binzel-abicor.com/US/eng/products/robotic-systems/gas-management-system-ewr-2-ewr-2-net/, retreived on Jan. 19, 2021, 13 pages.

Brooks Instruments, Mass Flow Controllers & Meters: Mass flow control technology. Unsurpassed process precision, retrieved from https://www.brooksinstrument.com/en/products/mass-flow-controllers, retrieved on Jan. 19, 2021, 6 pages.

Miller Electric Manufacturing Company, Spectrum 1250MG, Jun. 2000, 48 pages.

European Patent Office, Extended European Search Report, Application No. 21159544.2, dated Aug. 16, 2021, 6 pages.

Extended European Search Report, appln No. 22151249.4, dated Jun. 20, 2022, 9 pages.

Extended European Search Report for European Patent Application No. 22152645.2, dated Jul. 29, 2022, 10 pages.

European Patent Office, Office Action, Application No. 21159544.2, dated Mar. 28, 2023, 5 pages.

European Patent Office, Office Action, Application No. 22151249.4 dated Jun. 12, 2023, 6 pages.

* cited by examiner

MIXING FLUIDS IN WELDING-TYPE EQUIPMENT

TECHNICAL FIELD

This disclosure relates to welding-type equipment and, more particularly, mixing fluids in welding-type equipment.

BACKGROUND

Some welding-type processes use fluids (e.g., compressed air and/or or shielding gas) to protect (or shield) against impurities that can be caused by elements in the atmosphere. Different welding-type processes may use different types of fluid, and/or call for different rates of fluid flow. Some welding-type processes use mixtures of different types of fluids.

SUMMARY

Mixing fluids in welding-type equipment, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein.

Figure 1:
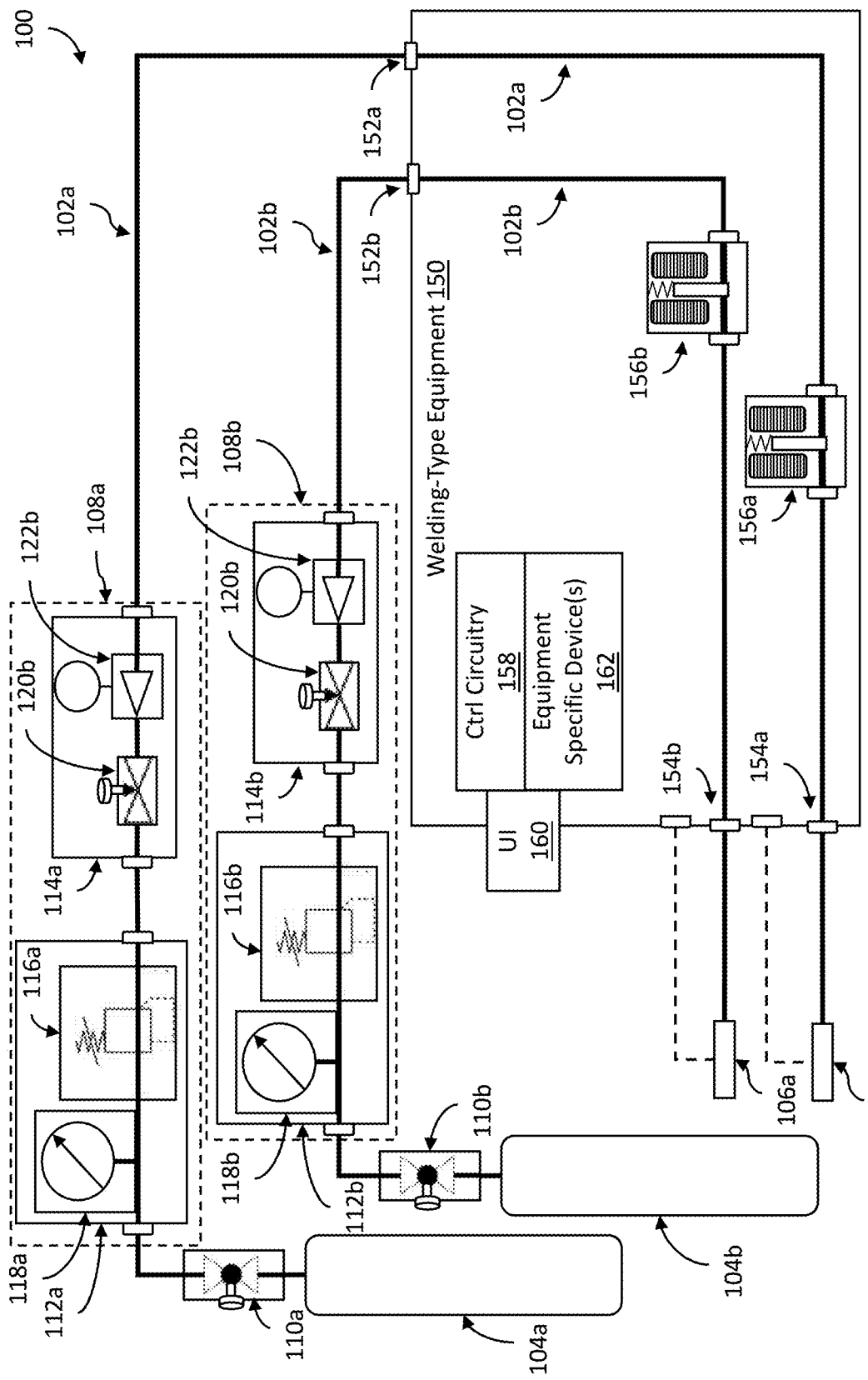
FIG. 1 is a diagram showing an example of a welding-type system, in accordance with aspects of this disclosure.

The figures are not necessarily to scale. Where appropriate, similar or identical reference numbers are used to refer to similar or identical components. For example, reference numerals utilizing lettering (e.g., fluid reservoir 104a, fluid reservoir 104b) refer to instances of the same reference numeral that does not have the lettering (e.g., fluid reservoirs 104).

DETAILED DESCRIPTION

Some welding-type power supplies are configured to supply power to different welding-type tools for different welding-type processes (e.g., gas metal arc welding (GMAW) and gas tungsten arc welding (GTAW)). Different welding-type processes may use different types of shielding gas and/or compressed air (collectively referred to hereinafter as "fluid"), and/or fluid mixtures. In order to accommodate the different welding-type processes, some welding-type power supplies may allow for multiple fluid reservoirs to be connected to a single welding-type power supply.

However, typically an operator must still manually (e.g., by hand) set a flow rate for each fluid reservoir. Further, reservoirs of fluid mixtures may be difficult and/or expensive to obtain. Additionally, the composition/concentrations of the fluid mixture in a premixed reservoir may actually change as the fluid is used, which may negatively impact a welding operation. While some fluid mixers may be available, acquiring, transporting, and/or configuring the mixer, in addition to all the other necessary welding-type equipment, can be burdensome.

Welding-type power supplies described herein provide mixing capabilities within the power supply itself, lessening (or entirely eliminating) the need for external mixers and/or pre-mixed fluid reservoirs. Electrically controllable proportional valves may be used to accurately and precisely mix fluids from several different fluid reservoirs inside the power supply, without the need for extra equipment. This can ensure consistent fluid mixture composition/concentrations, and make it easy to adjust fluid mixture composition/concentrations for different welding-type processes. The proportional valves may also allow an operator to automatically set flow rates, without having to manually adjust conventional flow regulators. Also, it may be relatively easy to modify existing welding-type power supplies that already allow for connection to several different fluid reservoirs to implement the improved fluid mixing capabilities.

Some examples of the present disclosure relate to a welding-type power supply, comprising a first fluid inlet configured for fluid connection with a first fluid reservoir; a second fluid inlet configured for fluid connection with a second fluid reservoir, the second fluid inlet being connected to a second fluid path of the welding-type power supply; a first fluid outlet configured for fluid connection with a first welding tool, the first fluid outlet being fluidly connected with the first fluid inlet through a first fluid path; a first valve having a first valve passage interposed in the first fluid path between the first fluid inlet and first fluid outlet, the first valve having a first plunger configured to adjustably restrict the first valve passage via a plurality of first steady state plunger positions; a third valve in fluid communication with the first fluid path and second fluid path, the third valve connecting to the first fluid path between the first fluid outlet and the first valve; and control circuitry configured to selectively control the first valve to provide a mixture of fluids from the first and second fluid reservoir to the first welding tool, via the first fluid outlet, when the first welding tool is being used.

In some examples, the welding-type power supply further comprises a second valve having a second valve passage interposed in the second fluid path between the second fluid inlet and the third valve, the second valve having a second plunger configured to adjustably restrict the second valve passage via a plurality of second steady state plunger positions, wherein the control circuitry is configured to selectively control the first valve and second valve to provide the mixture of fluids from the first and second fluid reservoirs to the first welding tool, via the first fluid outlet, when the first welding tool is being used. In some examples, the welding-type power supply further comprises a second fluid outlet configured for fluid connection with a second welding tool, the second fluid inlet being fluidly connected with the second fluid outlet through the second fluid path, and the third valve connecting to the second fluid path between the second valve and the second outlet. In some examples, the welding-type power supply further comprises a fourth valve having a fourth valve passage interposed in the second fluid path between the second fluid outlet and third valve, the fourth valve having a fourth plunger configured to open or close the fourth valve passage.

In some examples, the control circuitry is configured to selectively control the first valve, second valve, and fourth valve to provide the mixture of fluids from the first and second fluid reservoirs to the first welding tool, via the first fluid outlet, when the first welding tool is being used; and selectively control the second valve and fourth valve to provide fluid from the second fluid reservoir to the second welding tool, via the second outlet, when the second welding tool is being used. In some examples, the first valve or the second valve is a proportional valve configured to partially block fluid flow through the first valve passage or the second valve passage, via the first plunger or the second plunger, respectively. In some examples, the welding-type power supply further comprises a first flow meter configured to measure a first fluid flow rate through the first fluid path and a second flow meter configured to measure a second fluid flow rate through the second fluid path, wherein the control circuitry is configured to selectively control the first and second valves based on the first fluid flow rate and the second fluid flow rate.

In some examples, the control circuitry is configured to selectively control a first position of the first plunger and a second position of the second plunger via one or more control signals based on the first fluid flow rate, the second fluid flow rate, and a target mixture composition. In some examples, the third valve is a one way check valve, the control circuitry being further configured to close the fourth valve when mixing the fluids, so that fluid pressure in the second fluid path is sufficient to overcome a bias of the one way check valve, and open the fourth valve when providing fluid from the second fluid reservoir to the second welding tool, so that fluid pressure in the second fluid path is insufficient to overcome the bias of the one way check valve. In some examples, the welding-type power supply further comprises power conversion circuitry configured to convert input power to welding-type output power and deliver the welding-type output power to the first welding tool.

Some examples of the present disclosure relate to a welding wire feeder, comprising a first fluid inlet configured for fluid connection with a first fluid reservoir; a second fluid inlet configured for fluid connection with a second fluid reservoir, the second fluid inlet being connected to a second fluid path of the welding-type power supply; a first fluid outlet configured for fluid connection with a first welding tool, the first fluid outlet being fluidly connected with the first fluid inlet through a first fluid path; a first valve having a first valve passage interposed in the first fluid path between the first fluid inlet and first fluid outlet, the first valve having a first plunger configured to adjustably restrict the first valve passage via a plurality of first steady state plunger positions; a third valve in fluid communication with the first fluid path and second fluid path, the third valve connecting to the first fluid path between the first fluid outlet and the first valve; and control circuitry configured to selectively control the first valve to provide a mixture of fluids from the first and second fluid reservoir to the first welding tool, via the first fluid outlet, when the first welding tool is being used.

In some examples, the welding wire feeder further comprises a second valve having a second valve passage interposed in the second fluid path between the second fluid inlet and the third valve, the second valve having a second plunger configured to adjustably restrict the second valve passage via a plurality of second steady state plunger positions, wherein the control circuitry is configured to selectively control the first valve and second valve to provide the mixture of fluids from the first and second fluid reservoirs to the first welding tool, via the first fluid outlet, when the first welding tool is being used. In some examples, the welding wire feeder further comprises a second fluid outlet configured for fluid connection with a second welding tool, the second fluid inlet being fluidly connected with the second fluid outlet through the second fluid path, and the third valve connecting to the second fluid path between the second valve and the second outlet. In some examples, the welding wire feeder further comprises a fourth valve having a fourth valve passage interposed in the second fluid path between the second fluid outlet and third valve, the fourth valve having a fourth plunger configured to open or close the fourth valve passage.

In some examples, the control circuitry is configured to selectively control the first valve, second valve, and fourth valve to provide the mixture of fluids from the first and second fluid reservoirs to the first welding tool, via the first fluid outlet, when the first welding tool is being used; and selectively control the second valve and fourth valve to provide fluid from the second fluid reservoir to the second welding tool, via the second outlet, when the second welding tool is being used. In some examples, the first valve or the second valve is a proportional valve configured to partially block fluid flow through the first valve passage or the second valve passage, via the first plunger or the second plunger, respectively. In some examples, the welding wire feeder further comprises a first flow meter configured to measure a first fluid flow rate through the first fluid path and a second flow meter configured to measure a second fluid flow rate through the second fluid path, wherein the control circuitry is configured to selectively control the first and second valves based on the first fluid flow rate and the second fluid flow rate.

In some examples, the control circuitry is configured to selectively control a first position of the first plunger and a second position of the second plunger via one or more control signals based on the first fluid flow rate, the second fluid flow rate, and a target mixture composition. In some examples, the third valve is a one way check valve, the control circuitry being further configured to close the fourth valve when mixing the fluids, so that fluid pressure in the second fluid path is sufficient to overcome a bias of the one way check valve, and open the fourth valve when providing fluid from the second fluid reservoir to the second welding tool, so that fluid pressure in the second fluid path is insufficient to overcome the bias of the one way check valve. In some examples, the welding wire feeder further comprises a feed roller configured to feed welding wire to the first welding-type tool.

FIG. 1 is a diagram showing an example welding-type system 100. As shown, the welding-type system 100 includes two fluid paths 102 that fluidly connect two fluid reservoirs 104 with two welding-type tools 106 through two fluid regulators 108 and a piece of welding-type equipment 150 (e.g., a welding-type power supply and/or wire feeder). In some examples, the fluid paths 102 may be made up of one or more pipes, tubes, conduits, cables, hoses, and/or other fluid communication means. In some examples, each fluid reservoir 104 may contain and/or store a particular fluid (e.g., argon gas) and/or mixture of fluids (e.g., argon and carbon dioxide).

In the example of FIG. 1, each fluid reservoir 106 includes a globe valve 110 with a hand wheel that is configured to open and/or close the globe valve 110 when turned. When the globe valve 110 is closed, the globe valve 110 prohibits fluid from flowing from the fluid reservoir 106. When the globe valve 110 is opened, fluid may flow from the fluid reservoir 106 into the fluid path 102 of the welding-type system 100.

In the example of FIG. 1, each globe valve 110 of each fluid reservoir 104 is in fluid communication (e.g., via fluid path 102) with a fluid regulator 108 that is downstream from the globe valve 110, and upstream from the welding-type equipment 150 and welding-type tools 106. As used herein, upstream refers to a position in the fluid path 102 closer to a fluid reservoir 108, while downstream refers to a position in the fluid path 102 closer to a welding-type tool 108. As shown, each fluid regulator 108 includes a pressure regulator 112 and a flow regulator 114.

In the example of FIG. 1, each pressure regulator 112 includes a pressure valve 116 and a pressure gauge 118. In some examples, the pressure gauge 118 is configured to measure and indicate (e.g., via a dial) the fluid pressure in the fluid path 102 proximate the pressure gauge 118. While only one pressure gauge 118 is shown in the example of FIG. 1 for the sake of simplicity, in some examples, a pressure regulator 112 may have more than one pressure gauge 118 (e.g., one pressure gauge 118 upstream and another downstream of the pressure valve 116). In some examples, the pressure valve 116 is a mechanical device that reduces the pressure of the fluid flowing from the fluid reservoir 104 to a lower pressure that is more manageable for the welding-type system 100.

In the example of FIG. 1, each flow regulator 114 is downstream of each pressure regulator 112. As shown, each flow regulator 114 includes a needle valve 120 and a ball float flow meter 122. The needle valve 120 includes a hand adjustable knob configured to adjust the size of a valve opening in the needle valve 120 in response to movement (e.g., turning) of the knob (e.g., via the hand of an operator). In some examples, changing the size of the valve opening of the needle valve 120 changes a flow rate of fluid through the needle valve 120. In some examples, the ball float flow meter 122 measures the flow rate of fluid through the fluid path 102 downstream (or, in some examples, upstream) of the needle valve 120. A ball that moves up in down in a marked tube of the ball float flow meter 122 can be read by a nearby operator to determine the fluid flow rate measured by the ball float flow meter 122 In some examples, other mechanical flow meters may be used instead of the ball float flow meter 122.

In the example of FIG. 1, each fluid regulator 108 is in fluid communication (e.g., via fluid path 102) with a downstream inlet port 152 of the welding-type equipment 150. Each inlet port 152 is in fluid communication (e.g., via fluid paths 102 internal of welding-type equipment 150) with an outlet port 154 of the welding-type equipment 150. As shown, an on/off solenoid valve 156 is interposed in each fluid path 102 between each inlet port 152 and outlet port 154 of the welding-type equipment 150. In some examples, there may be no on/off solenoid valve 156, or only one on/off solenoid valve 156. In some examples, one or more of the on/off solenoid valves 156 may instead be proximate and/or part of a welding-type tool 106. As shown, the welding-type tools 106 are fluidly connected (e.g., via fluid path 102) to separate outlet ports 154 of the welding-type equipment 150.

In some examples, the welding-type tool(s) 106 may be configured for arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes). In some examples, the welding-type tool(s) 106 may configured for plasma cutting or induction heating.

In the example of FIG. 1, the welding-type equipment 150 also has a separate, non-fluid, connection to each welding-type tool 108. In some examples, these connections may be used for routing electrical power, electrical signals, and/or wire, for example. In some examples, the connections of the welding-type equipment 150 to each welding-type tool 106 may be implemented via a single welding cable, or several different cables.

In the example of FIG. 1, the welding-type equipment 150 includes control circuitry 158, a user interface (UI) 160, and one or more equipment specific devices 162 interconnected with one another. In some examples, the control circuitry 158 may include memory circuitry and/or processing circuitry. Though not shown for the sake of clarity and simplicity, in some examples, the control circuitry 158 may be in electrical communication with the on/off solenoid valves 156 (e.g., to control the operation of the on/off solenoid valves 156).

In some examples, the UI 160 may comprise user accessible inputs and/or outputs. For example, the UI 160 may comprise one or more visual outputs (e.g., touch display screens, video monitors, light emitting diodes, incandescent lights, and/or other lights, etc.) and/or one or more audio outputs (e.g., audio speakers). In some examples, the UI 160 may further comprise one or more inputs (e.g., touch display screens, buttons, knobs, switches, microphones, etc.). In some examples, the UI 160 may comprise one or more input and/or output ports and/or devices (e.g., USB ports, audio ports, HDMI ports, etc.).

In some examples, the equipment specific device(s) 162 may include devices specific to the particular piece of welding-type equipment 150. For example, where the welding-type equipment 150 is a welding-type power supply, the equipment specific device(s) 162 may include power conversion circuitry configured to receive input power, and convert the input power to welding-type output power (e.g., used by the welding-type tool(s) 106). As another example, where the welding-type equipment 150 is a wire feeder, the equipment specific device(s) 162 may include a motor and several wire rollers to feed wire to the welding-type tool(s) 106. In some examples, the one or more of the equipment specific devices 162 may be controlled by the control circuitry 158.

In some examples, the welding-type equipment 150 may open or close a fluid path 102 depending on whether the associated welding-type tool 106 is performing a welding-type operation. For example, a welding-type tool 106 may send one or more control signals to the control circuitry 158 (e.g., in response to an activation and/or deactivation of the welding-type tool 106), and the control circuitry 158 may control an on/off solenoid valve 156 based on the signal(s) received from an associated welding-type tool 106. Thus, the welding-type equipment 150 may control when/whether fluid from the fluid reservoir 104a is provided to the welding-type tool 106a, and/or fluid from the fluid reservoir 104b is provided to the welding-type tool 106b.

However, the welding-type equipment 150 provides no means by which fluid from the fluid reservoir 104a may be mixed with fluid from the fluid reservoir 104b, before being provided to a welding-type tool 106. In the example of FIG. 1, the only way for a welding-type tool 106 to be provided a mixture of fluids is to obtain and/or use a fluid reservoir 104 containing a premixed fluid mixture. While an operator might be able to instead use some external fluid mixer, and connect the mixer to the welding-type equipment 150, this would require either obtaining a third fluid reservoir 104, or disconnecting one of the other two fluid reservoirs 104 from the welding-type equipment 150 (which would mean one of the welding-type tools 106 could no longer use that fluid reservoir 104).

Additionally, there is no way for the welding-type equipment 150 to automatically control the fluid flow rate through the fluid paths 102. While fluid flow rate can be controlled via the needle valves 120, this requires an operator to physically travel to the needle valve(s) 120 (which may be some distance away) and manually adjust the hand knob(s) Likewise, an operator would have to physically travel to the ball float flow meter(s) 122 to determine the fluid flow rate, and the ball float flow meter(s) 122 can sometimes be difficult to interpret. Additionally, the fluid flow rate can only be determined and/or adjusted while fluid is flowing, which can be wasteful of fluid.

Figure 2:
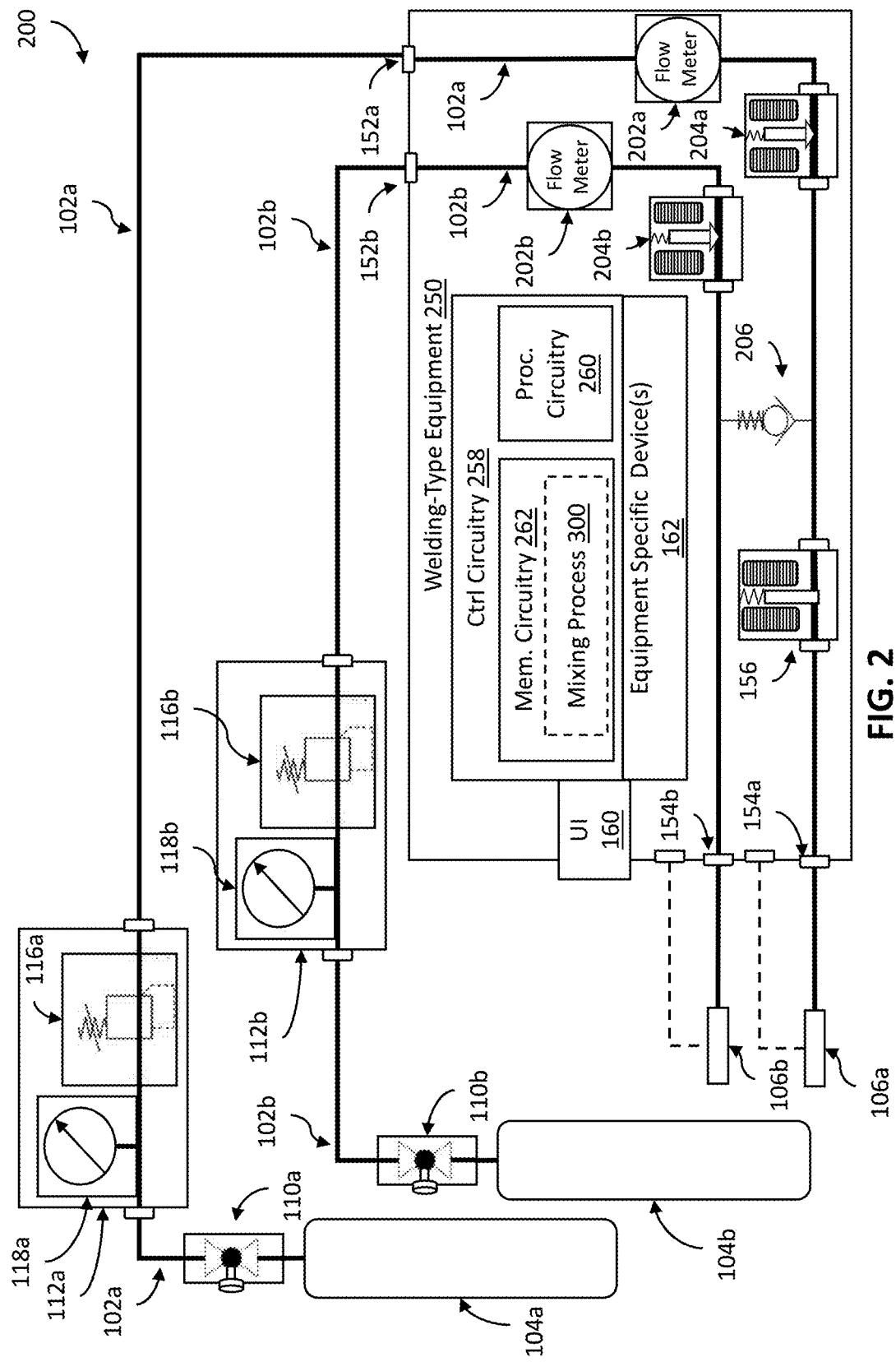
FIG. 2 is a diagram showing an example of an improved welding-type system, in accordance with aspects of this disclosure.

FIG. 2 is a diagram showing an example improved welding-type system 200. As shown, the improved welding-type system 200 shares some similarities with the welding-type system 100 of FIG. 1. For example, the improved welding-type system 200 also includes two flow paths 102 fluidly connecting two fluid reservoirs 104, two pressure regulators 112, and two welding-type tools 106. However, the welding-type system 100 no longer includes flow regulators 114 (though, in some examples, one or more flow regulators 114 may be included). Also unlike the welding-type system 100, the improved welding-type system 200 depicted in FIG. 1 fluidly connects the two fluid reservoirs 104, two pressure regulators 112, and two welding-type tools 106 through a piece of improved welding-type equipment 250, rather than the welding-type equipment 150 of FIG. 1.

In the example of FIG. 2, the improved welding-type equipment 250 still includes the UI 160 and the equipment specific device(s) 162. However, rather than the control circuitry 158 of the welding-type equipment 150, the improved welding-type equipment includes improved control circuitry 258. As shown, the improved control circuitry 258 includes processing circuitry 260 and memory circuitry 262. In some examples, the processing circuitry 260 may include one or more processors. As shown, the memory circuitry 262 includes (and/or stores) a fluid control process 300, further discussed below. Though abstracted for the sake of simplicity, in some examples, the equipment specific device(s) 162, UI 160, and improved control circuitry 258 may be interconnected with one another (e.g., via a common electrical bus).

In the example of FIG. 2, the improved welding-type equipment 250 also includes two electric flow meters 202 and two proportional solenoid valves 204. As shown, the electric flow meters 202 and proportional solenoid valves 204 are interposed in the two fluid paths 102 between the two inlets 152 and outlets 154 of the improved welding-type equipment 250. In some examples, the improved welding-type equipment 250 may further include one or more pressure gauges 118 (and/or other pressure sensors) configured to measure a pressure in the fluid path(s) 102 of the improved welding-type equipment 250. Though not shown for the sake of simplicity, in some examples, the electric flow meters 202 and proportional valves 204 (and/or pressure gauges/sensors) may be in electrical communication with the improved control circuitry 258.

In some examples, the electric flow meters 202 measure a flow rate of fluid through the fluid flow paths 102 of the improved welding-type equipment 250 (and/or the electric flow meters 202). In some examples, the electric flow meter(s) 202 may be configured to measure other parameters, such as, for example, a temperature and/or density of the fluid flowing through the fluid flow paths 102 of the improved welding-type equipment 250 (and/or the electric flow meters 202). In some examples, the electric flow meter 202 may output or more signals representative of the fluid flow rate and/or density/temperature measurement(s) (e.g., to the improved control circuitry 258). In some examples, the fluid flow rate and/or density/temperature measurement(s) may be indicated to an operator via the UI 160. While shown as being upstream from the proportional valves 204 in the example of FIG. 2, in some examples, the electric flow meters 202 may instead be downstream of the proportional valves 204.

In the example of FIG. 2, each proportional solenoid valve 204 includes a plunger that is spring biased towards a closed position where the plunger completely obstructs fluid flow through the flow path 102 of the proportional valve 204. The proportional valve 204 includes electrical conductor windings configured to move the plunger via electromagnetic force when the windings conduct electrical current. In some examples, the proportional valve 204 is configured to move the plunger to a variety of different steady state positions (and hold the plunger at those position(s)) depending upon the amount of current conducted through the windings. Thus, the proportional valve 204 may restrict fluid flow entirely, not at all, and/or to any degree in between by energizing the proportional valve 204 with the appropriate amount of electrical current. In some examples, the improved control circuitry 258 may control how much electrical current is used to energize the proportional valve 204, and/or otherwise control the degree to which the plunger of the proportional valve 204 restricts fluid flow through the proportional valve 204. In some examples, the proportional valve 204 may be a servo valve, and/or some other electrically controllable valve.

In some examples, the electric flow meters 202 and proportional valves 204 may allow an operator to measure, understand, and/or regulate a rate of fluid flow to a welding-type tool 106 via the welding-type equipment 150, rather than needing an external flow regulator 114. For example, an operator may enter a target flow rate for a particular welding-type tool 106 (e.g., via UI 160) and the improved control circuitry 258 may continuously control and/or adjust the appropriate proportional valve(s) 204 using feedback from the corresponding electric flow meter 202 to achieve the target flow rate for that welding-type tool 106. In some examples, the target flow rate may be automatically determined (e.g., by the improved control circuitry 258) based on user input (e.g., a selected welding-type process, operational program, voltage, current, wire type, etc.).

In the example of FIG. 2, the improved welding-type equipment 250 still includes a single on/off solenoid valve 156 interposed in the flow path 102a between the inlet 152a and outlet 154a. As shown, the on/off solenoid valve 156 is positioned downstream of the proportional valve 204a. Though not shown for the sake of simplicity, in some examples, the on/off solenoid valve 156 may be in electrical communication with the improved control circuitry 258. In some examples, the on/off solenoid valve 156, outlet port 154a, and/or welding-type tool 106a may be omitted.

In the example of FIG. 2, the improved welding-type equipment 250 includes a one-way ball check valve 206 fluidly connecting the fluid path 102a and fluid path 102b within the welding-type equipment 150. As shown, the check valve 206 is positioned downstream of both proportional valves 204 and upstream of the on/off solenoid valve 156. The check valve 206 includes a ball that is spring biased towards a position where fluid flow through the check valve 206 is completely obstructed. In this configuration, the check valve 206 will not allow fluid to flow from the fluid path 102b to the fluid path 102a through the check valve 206. However, the check valve 206 may allow fluid to flow through the check valve 206 from the fluid path 102a to the fluid path 102b when a fluid pressure in the fluid path 102a (e.g., between the on/off solenoid valve 156 and proportional valve 204a) is sufficient to overcome the spring bias of the check valve 206. In some examples, the check valve 206 (and/or other components of the improved welding-type equipment 250) may be configured such that the threshold fluid pressure sufficient to overcome the spring bias of the check valve 206 may only be obtained when the on/off solenoid valve 156 is closed and fluid flow through the flow path 102a is above a given flow rate threshold.

In some examples, a different type of one-way check valve 206 may be used instead of a ball valve. In some examples, a mixing valve may be used instead of a one-way check valve 206. In some examples, an additional on/off solenoid valve 156 or proportional valve 204 may be used instead of the one-way check valve 206 (though this may increase the cost and/or complexity of the improved welding-type equipment 250). In examples where an additional on/off solenoid valve 156 or proportional valve 204 is used instead of the one-way check valve 206, the additional on/off solenoid valve 156 or proportional valve 204 may only be opened when the improved welding-type equipment 250 is seeking to mix fluids (and/or when the other on/off solenoid valve 156 is closed).

In some examples, the arrangement of the various valves of the welding-type equipment 150 may allow for real-time fluid mixing within the welding-type equipment 150. For example, when desired (e.g., when providing fluid to the welding-type tool 106b), the improved control circuitry 258 may be configured to close the on/off solenoid valve 156 and open the proportional valve 204a to such of a degree that fluid pressure in the fluid path 102a is sufficient to overcome the spring bias of the one-way check valve 206. The control circuitry 158 may also open the proportional valve 204b, such that fluid from both the fluid reservoir 104a and fluid reservoir 104b combine and mix together in the fluid path 102b (and/or check valve 206) before flowing to the welding-type tool 106b. In some examples, a mixing chamber may be provided in the fluid path 102b of the improved welding-type equipment 250 (e.g., in or downstream of the check valve 206) to provide a space for the fluids to mix.

Thus, an operator may be able to easily obtain, in real-time, a desired fluid mixture for a welding-type operation using the improved welding-type equipment 250, and without needing extra equipment. Additionally, an operator can leave both fluid reservoirs 104 attached to the improved welding-type equipment 250 at all times (except when a refill is needed), and easily switch between using a single fluid reservoir 104 or a mixture of two fluid reservoirs 104. Furthermore, an operator can quickly, easily, and automatically determine and/or adjust the fluid flow rate for each fluid reservoir 104 (and/or fluid path 102) without having to travel to and/or manually adjust a flow regulator 114.

While the example improved welding-type system 200 depicted in FIG. 2 includes two fluid reservoirs 102 and two welding-type tools 106 in fluid communication with two inlets 152 and outlets 154 of a piece of improved welding-type equipment 250, in some examples, the improved welding-type system 200 may include three, four, or more fluid reservoirs 102, welding-type tools 106, inlets 152, and/or outlets 154.

Figure 3:
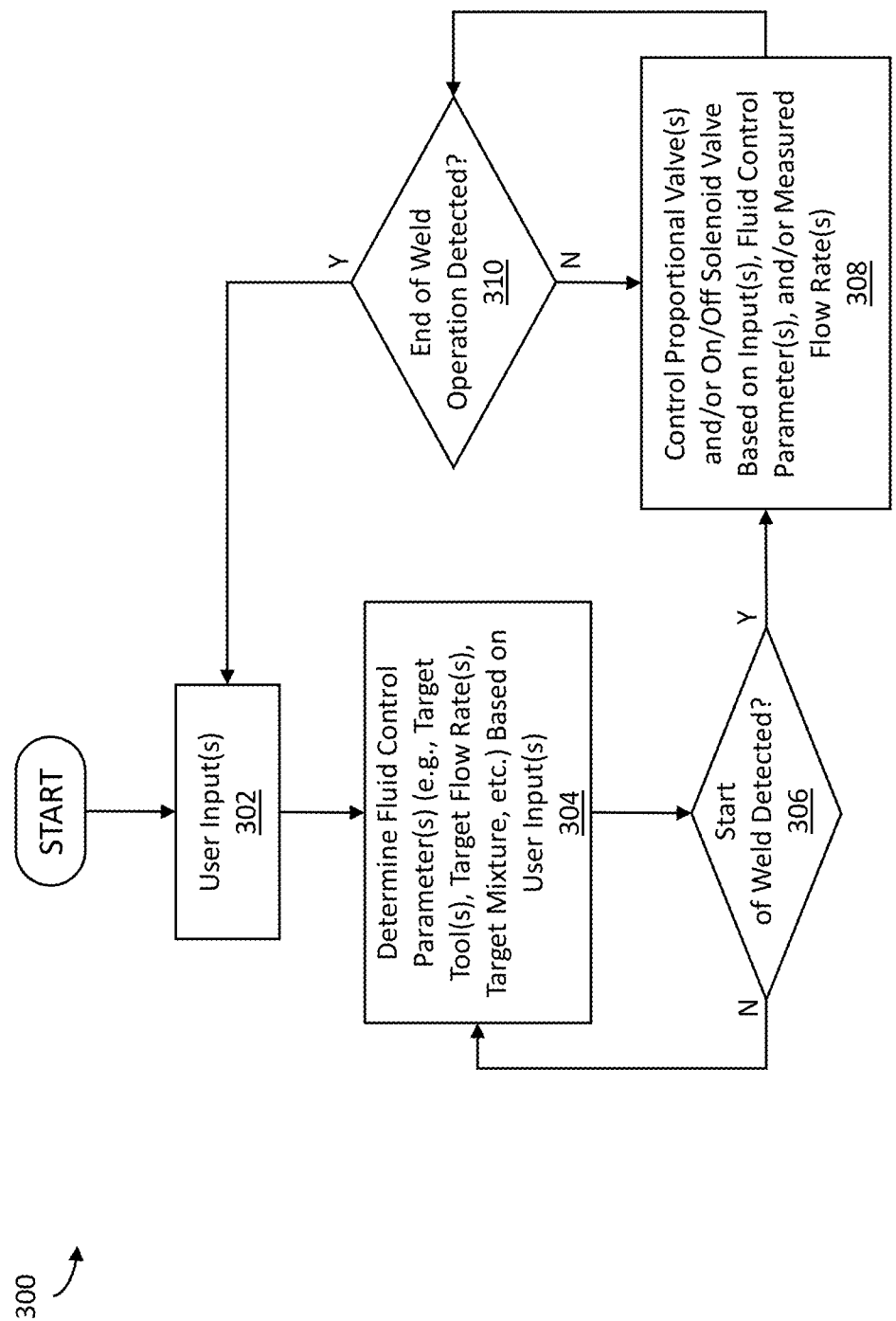
FIG. 3 is a diagram of an example fluid control process, in accordance with aspects of this disclosure.

FIG. 3 is a flow diagram illustrating an example operation of the fluid control process 300. While depicted as being stored in memory circuitry 262 in the example of FIG. 2, in some examples, the fluid control process 300 may be implemented via discrete circuitry (e.g., of the improved control circuitry 258). In some examples, the fluid control process 300 may comprise machine readable instructions.

In the example of FIG. 3, the fluid control process 300 begins at block 302, where an operator and/or other user provides one or more inputs to the improved welding-type equipment 250. In some examples, the inputs may be provided via the UI 160 of the improved welding-type equipment 250. In some examples, the inputs may be provided via some remote control device in communication with the welding-type equipment 150. In some examples, the one or more inputs may include data about the improved welding-type system 200 and/or target welding-type process/operation. Such data may include, for example, the type(s)/composition(s) of fluid(s) in the fluid reservoir(s) 104, type(s) of fluid reservoir(s) 104, size of fluid reservoir(s) 104, identifier(s) of fluid reservoir(s) 104, target fluid flow rate(s), target fluid mixture composition, target output current(s), target output voltage(s), target output power, target wire feed speed(s), target welding-type process(es), target welding-type operation(s), positioning of the welding-type tool(s) 106, type of welding-type tool(s) 106, type of wire, diameter of wire, type of material, and/or other pertinent information corresponding to each inlet 152, outlet 154, flow path 102, welding-type tool 106, and/or welding-type process.

In the example of FIG. 3, the fluid control process 300 proceeds to block 304 after block 302. At block 304, the fluid control process 300 determines one or more fluid control parameters based on the input received at block 302. In some examples, the fluid control parameters may include information used by the fluid control process 300 to control the components of the improved welding-type equipment 250. Such information may include some or all of the same data listed above with respect to block 302.

For example, the user may input a target fluid mixture composition and types of fluid in the reservoir(s) 104 at block 302, and at block 304 the fluid control process 300 may determine the target fluid flow rates for each fluid path 102 in order to achieve the target mixture composition. As another example, the user may input an identifier of a (or each) each fluid reservoir(s) 104 associated with the an (or each) inlet 152, the type(s) of welding-type tool 106 associated with an (or each) outlet 154, and the tool 106 and/or welding-type process they want to use at block 302, and at block 304 the fluid control process 300 may automatically determine the appropriate target mixture (if appropriate), and/or the appropriate fluid flow rate(s) for a (or each) fluid path 102. In some examples, the fluid control process 300 may additionally, or alternatively, determine finer details at block 304, such as, for example, how far to open/close a proportional valves 204 to achieve a target mixture and/or flow rate, and/or the appropriate amount of current to route to the on/off solenoid valve 156 and/or a proportional valve 204 to achieve a target flow rate or mixture composition.

In some examples, the memory circuitry 262 may store one or more data structures (e.g., databases, tables, linked lists, etc.) to assist the fluid control process 300 with the determination(s) at block 304. For example, the data structure(s) may map certain input data (e.g., welding-type process, fluid type/composition, etc.) to corresponding fluid control parameters (e.g., target fluid mixture composition, target fluid flow rate, etc.). In some examples, the improved welding-type equipment 250 may be configured to automatically detect, and/or the memory circuitry 262 configured to store, certain other information (e.g., about the improved welding-type equipment 250) that may assist the fluid control process 300. For example, an outlet port 154 may be configured for only a particular type of welding-type tool 106, and this information may be stored in memory circuitry 262. As another example, the welding-type equipment may be configured to automatically detect whether a welding-type tool 106 is connected to an outlet port 154, and/or what type of fluid is entering an inlet 152 and/or flowing through a fluid path 102 (e.g., based on a flow rate and temperature measurement, light frequency absorption/reflection measurement, pressure and density measurement, etc.).

In the example of FIG. 3, the fluid control process 300 proceeds to block 306 after block 304. At block 306, the fluid control process 300 determines whether welding has begun. In some examples, this may entail determining whether a welding-type tool 106 (and/or which welding-type tool 106) has been activated. For example, an activation signal may be sent to the improved control circuitry 258 when a welding-type tool 106 is activated (e.g., from a trigger pull, foot pedal press, etc.). This activation signal may be used to signal the improved welding-type equipment 250 to begin sending power and/or wire to the appropriate welding-type tool 106. The activation signal may also be used to signal the fluid control process 300 to begin supplying fluid to the welding-type tool 106 via the appropriate fluid path 102 and/or outlet 154. As shown, the fluid control process 300 returns to block 304 if welding has not begun (though, in some examples, the fluid control process 300 may instead return to block 302).

In the example of FIG. 3, the fluid control process 300 proceeds to block 308 after block 306 if welding has begun. At block 308, the fluid control process 300 controls the proportional valve(s) 204 and/or on/off solenoid valve 156 based on the fluid control parameters determined at block 304 and/or data input at block 302. For example, the fluid control process 300 may control the proportional valve(s) 204 and/or on/off solenoid valve 156 to achieve the target flow rate(s) and/or fluid mixture determined at block 304 (and/or input at block 302).

In some examples, controlling the on/off solenoid valve 156 may include controlling the delivery of an appropriate amount of electrical current to the windings of the on/off solenoid valve 156 to open/close the valve. In some examples, controlling a proportional valve 204 may include controlling the delivery of an appropriate amount of electrical current to the windings of the proportional valve 204 to move the plunger to (and/or hold the plunger at) a position that will allow fluid to flow at the target flow rate. In some examples, the flow rate measurement(s) of the electric flow meter(s) 202 may be continuously monitored, and the proportional valve(s) 204 controlled accordingly, to achieve the target flow rate(s).

In some examples, the fluid control process 300 may be configured to indicate to the operator (e.g., via UI 160) information about the fluid control process 300 at block 308. For example, the fluid control process 300 may indicate information input and/or determined at previous blocks, such as, for example, a target/measured flow rate(s) through a flow path 102, a pressure in a flow path 102, a percentage of each fluid reservoir 104 used to create a fluid mixture, and/or other information. In some examples, the UI 160 may show or otherwise indicate the information proximate an appropriate inlet 152 and/or outlet 154 to facilitate easy understanding. In some examples, the fluid control process 300 may additionally determine and/or indicate at block 308 whether the fluid control process 300 is unable to achieve a target fluid flow rate (e.g., after a threshold amount of time), which may be indicative of some issue in the fluid path(s) 102 and/or with a fluid reservoir 104.

In the example of FIG. 3, the fluid control process 300 proceeds to block 310 after block 308. At block 310, the fluid control process 400 determines whether the welding operation that was begun at block 306 has ended. In some examples, this may entail determining whether a welding-type tool 106 has been deactivated. For example, the activation signal sent to the control circuitry 258 when the welding-type tool 106 is activated (e.g., from a trigger pull, foot pedal press, etc.) may be absent when the welding-type tool 106 has been deactivated (or a separate deactivation signal may be sent). As shown, the fluid control process 300 returns to block 308 after block 310 if the welding operation has not ended, and returns to block 302 if the welding operation has ended (though, in some examples, the fluid control process may instead return to block 304 instead of block 302, or end).

Figure 4:
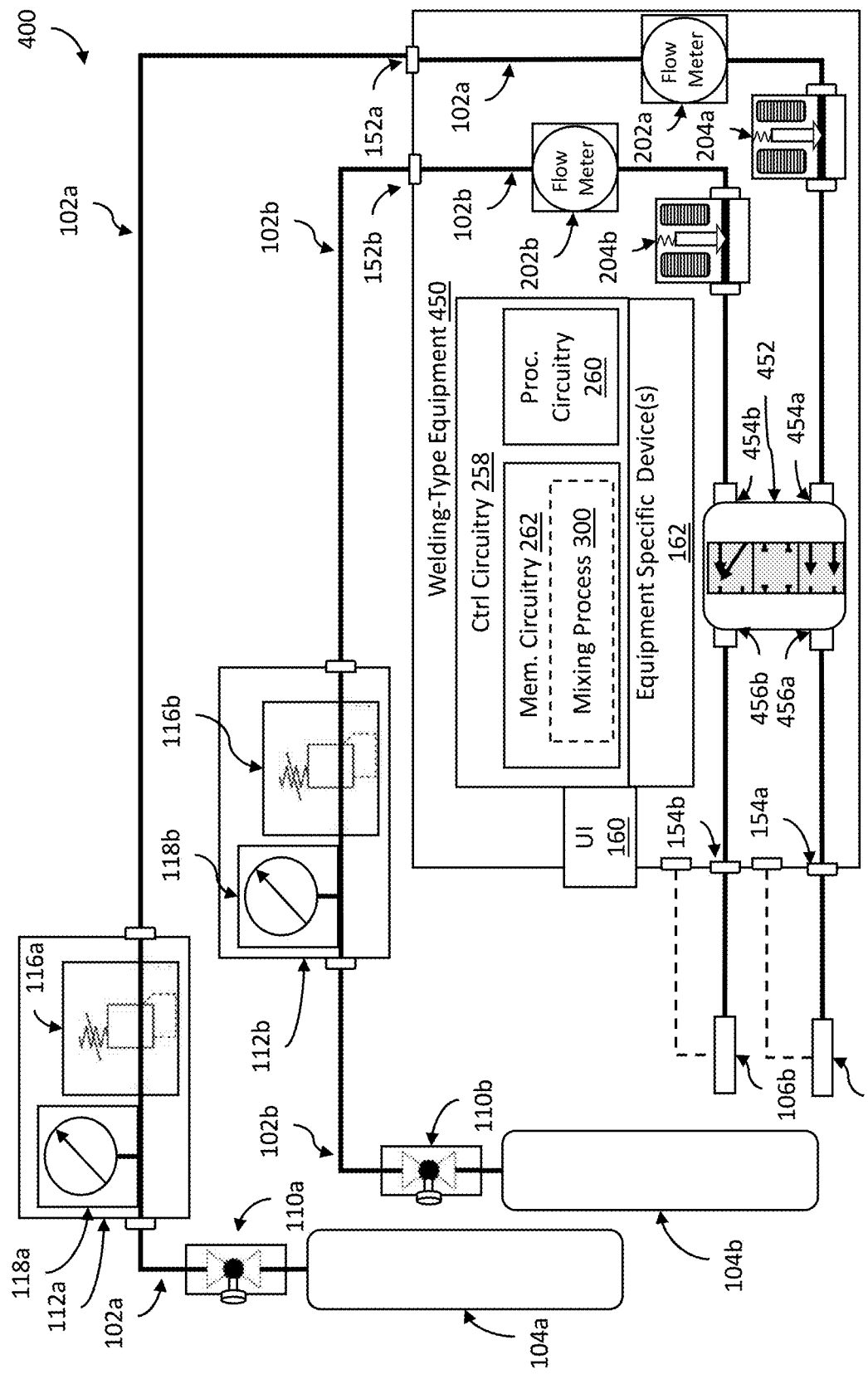
FIG. 4 is a diagram showing an example of an alternative improved welding-type system, in accordance with aspects of this disclosure.

FIG. 4 is a diagram showing an example alternative improved welding-type system 400. As shown, the alternative improved welding-type system 400 is almost identical with the improved welding-type system 200. However, unlike the improved welding-type system 200, the alternative improved welding-type system 400 includes alternative improved welding-type equipment 450 having a custom valve 452 instead of the on/off solenoid valve 156 and one-way check valve 206.

In the example of FIG. 4, the custom valve 452 is in fluid communication with both fluid paths 102, both outlet ports 154, and both proportional solenoid valves 204. More particularly, the custom valve 452 has two valve inlets 454 and two valve outlets 456, with each valve inlet 454 being in fluid communication with a proportional solenoid valve 204, and each valve outlet 456 being in fluid communication with an outlet port 154. While not shown in the example of FIG. 4 for the sake of simplicity, in some examples, the custom valve 452 may also be in electrical communication with the control circuitry 258.

In some examples, the custom valve 452 may be solenoid valve. In some examples, the custom valve 452 may have three valve configurations: either prohibiting fluid from flowing through the custom valve 452 entirely, directing fluid flow straight through the custom valve 452 along the respective fluid paths 102 (e.g., from proportional valve 204a to outlet port 154a and proportional valve 204b to outlet port 154b), or directing all fluid to flow to the fluid path 102b and/or outlet port 154b (e.g., effectively connecting the two fluid paths 102 and/or mixing the fluids). In this way, the custom valve 452 may control when and/or whether fluid mixing occurs.

For example, the custom valve 452 may have a plunger with three different channel configurations formed in the plunger at three different heights of the plunger. The custom valve 452 may further include electrical conductor windings configured to move the plunger via electromagnetic force when the windings conduct electrical current. Further, the custom valve 452 may be configured to move the plunger to different heights via the electromagnetic force depending on the electrical current supplied to the windings (e.g., by the equipment control circuitry 258), so as to bring the different channel configurations to bear.

In some examples, the equipment control circuitry may 258 may control when and/or whether fluid mixing occurs by controlling the configuration of the custom valve 452 (rather than the on/off solenoid valve 156). In some examples, the custom valve 452 may be (e.g., spring) biased towards a particular configuration by default (e.g., the flow-prohibiting or straight through configuration). In some examples, the custom valve 452 may instead have only two configurations, with the flow-prohibiting configuration being omitted.

The example improved welding-type systems 200/300 and/or improved welding-type equipment 250/350 allows an operator to easily, automatically, and/or consistently produce a desired fluid mixture for a welding-type operation on the fly, in real-time, without the need for extra equipment. Additionally, an operator can leave both fluid reservoirs 104 attached to the improved welding-type equipment 250/350 at all times (except when a refill is needed), and easily switch between using any of multiple individual fluid reservoirs 104, and/or a mixture of two fluid reservoirs 104, without having to disconnect and reconnect fluid reservoir(s) 104 to change fluids. Furthermore, an operator can quickly, easily, and/or automatically determine and/or adjust the fluid flow rate for each fluid reservoir 104 (and/or fluid path 102), and/or a fluid mixture composition/concentration, without having to travel to and/or manually adjust a flow regulator 114. Also, the welding-type equipment 150 may be relatively easily (and/or inexpensively) modified to make the improved welding-type equipment 250/350.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "approximate" and/or "approximately," when used to modify or describe a value (or range of values), position, shape, orientation, and/or action, mean reasonably close to that value, range of values, position, shape, orientation, and/or action. Thus, the examples described herein are not limited to only the recited values, ranges of values, positions, shapes, orientations, and/or actions but rather should include reasonably workable deviations.

As utilized herein, the terms "e.g.," and "for example" set off lists of one or more non-limiting examples, instances, or illustrations.

As used herein, the terms "couple," "coupled," "attach," "attached," "connect," and/or "connected" refer to a structural and/or electrical affixing, joining, fasten, linking, and/or other securing.

As utilized herein the terms "circuits" and "circuitry" refer to physical electronic components (i.e. hardware) and/or any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "configured" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a welding-type tool refers to any tool capable of performing a welding, cladding, brazing, plasma cutting, induction heating, carbon arc cutting or gouging and/or resistive preheating operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

While the present method and/or system has been described with reference to certain implementations, it will be understood by those skilled in the art that various changes may be made and equivalents may be substituted without departing from the scope of the present method and/or system. For example, blocks and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a first fluid inlet configured for fluid connection with a first fluid reservoir, the first fluid inlet being connected to a first fluid path of the welding-type power supply;
   a second fluid inlet configured for fluid connection with a second fluid reservoir,
   a second fluid outlet configured for fluid connection with a second welding tool, the second fluid outlet being fluidly connected with the second fluid inlet through a second fluid path;
   a second valve having a second valve passage interposed in the second fluid path between the second fluid inlet and second fluid outlet, the second valve having a second plunger configured to adjustably restrict the second valve passage via a plurality of second steady state plunger positions;
   a third valve in fluid communication with the first fluid path and second fluid path, the third valve connecting to the second fluid path between the second fluid outlet and the second valve;
   power conversion circuitry configured to convert input power to welding-type output power and deliver the welding-type output power to the second welding tool; and
   control circuitry configured to selectively control the second valve to provide a mixture of fluids from the first and second fluid reservoirs to the second welding tool, via the second fluid outlet, when the second welding tool is being used.

2. The welding-type power supply of claim 1, further comprising:
   a first valve having a first valve passage interposed in the first fluid path between the first fluid inlet and the third valve, the first valve having a first plunger configured to adjustably restrict the first valve passage via a plurality of first steady state plunger positions,
   wherein the control circuitry is configured to selectively control the first valve and second valve to provide the mixture of fluids from the first and second fluid reservoirs to the second welding tool, via the second fluid outlet, when the second welding tool is being used.

3. The welding-type power supply of claim 2, further comprising a first fluid outlet configured for fluid connection with a first welding tool, the first fluid inlet being fluidly connected with the first fluid outlet through the first fluid path, and the third valve connecting to the first fluid path between the first valve and the first outlet.

4. The welding-type power supply of claim 3, further comprising a fourth valve having a fourth valve passage interposed in the second fluid path between the second fluid outlet and third valve, the fourth valve having a fourth plunger configured to open or close the fourth valve passage.

5. The welding-type power supply of claim 4, wherein the control circuitry is configured to:
   selectively control the first valve, second valve, and fourth valve to provide the mixture of fluids from the first and second fluid reservoirs to the second welding tool, via the second fluid outlet, when the second welding tool is being used; and
   selectively control the first valve and fourth valve to provide fluid from the first fluid reservoir to the first welding tool, via the first outlet, when the first welding tool is being used.

6. The welding-type power supply of claim 5, wherein the first valve or the second valve is a proportional valve configured to partially block fluid flow through the first valve passage or the second valve passage, via the first plunger or the second plunger, respectively.

7. The welding-type power supply of claim 6, further comprising a first flow meter configured to measure a first fluid flow rate through the first fluid path and a second flow meter configured to measure a second fluid flow rate through the second fluid path, wherein the control circuitry is configured to selectively control the first and second valves based on the first fluid flow rate and the second fluid flow rate.

8. The welding-type power supply of claim 7, wherein the control circuitry is configured to selectively control a first position of the first plunger and a second position of the second plunger via one or more control signals based on the first fluid flow rate, the second fluid flow rate, and a target mixture composition.

9. The welding-type power supply of claim 4, wherein the third valve is a one way check valve, the control circuitry being further configured to:
   close the fourth valve when mixing the fluids, so that fluid pressure in the first fluid path is sufficient to overcome a bias of the one way check valve, and
   open the fourth valve when providing fluid from the first fluid reservoir to the first welding tool, so that fluid pressure in the first fluid path is insufficient to overcome the bias of the one way check valve.

10. The welding-type power supply of claim 1, wherein the control circuitry is configured to:
   control the power conversion circuitry to convert the input power to welding-type output power, and
   control the second valve to provide a mixture of fluids from the first and second fluid reservoirs to the second welding tool, via the second fluid outlet, in response to receiving a signal indicating that the second welding tool is being used.

11. A welding wire feeder, comprising:
   a first fluid inlet configured for fluid connection with a first fluid reservoir, the first fluid inlet being connected to a first fluid path of the welding-type power supply;
   a second fluid inlet configured for fluid connection with a second fluid reservoir;
   a second fluid outlet configured for fluid connection with a second welding tool, the second fluid outlet being fluidly connected with the second fluid inlet through a second fluid path;
   a second valve having a second valve passage interposed in the second fluid path between the second fluid inlet and second fluid outlet, the second valve having a second plunger configured to adjustably restrict the second valve passage via a plurality of second steady state plunger positions;
   a third valve in fluid communication with the first fluid path and second fluid path, the third valve connecting to the second fluid path between the second fluid outlet and the second valve;
   a feed roller configured to feed welding wire to the second welding tool; and
   control circuitry configured to selectively control the second valve to provide a mixture of fluids from the first and second fluid reservoirs to the second welding tool, via the second fluid outlet, when the second welding tool is being used.

12. The welding wire feeder of claim 11, further comprising:
   a first valve having a first valve passage interposed in the first fluid path between the first fluid inlet and the third valve, the first valve having a first plunger configured to adjustably restrict the first valve passage via a plurality of first steady state plunger positions;
   wherein the control circuitry is configured to selectively control the first valve and second valve to provide the mixture of fluids from the first and second fluid reservoirs to the second welding tool, via the second fluid outlet, when the second welding tool is being used.

13. The welding wire feeder of claim 12, further comprising a first fluid outlet configured for fluid connection with a first welding tool, the second first fluid inlet being fluidly connected with the first fluid outlet through the first fluid path, and the third valve connecting to the first fluid path between the first valve and the first outlet.

14. The welding wire feeder of claim 13, further comprising a fourth valve having a fourth valve passage interposed in the second fluid path between the first second fluid outlet and third valve, the fourth valve having a fourth plunger configured to open or close the fourth valve passage.

15. The welding wire feeder of claim 14, wherein the control circuitry is configured to:
   selectively control the first valve, second valve, and fourth valve to provide the mixture of fluids from the first and second fluid reservoirs to the second welding tool, via the second fluid outlet, when the second welding tool is being used; and
   selectively control the first valve and fourth valve to provide fluid from the first fluid reservoir to the first welding tool, via the first outlet, when the first welding tool is being used.

16. The welding wire feeder of claim 15, wherein the first valve or the second valve is a proportional valve configured to partially block fluid flow through the first valve passage or the second valve passage, via the first plunger or the second plunger, respectively.

17. The welding wire feeder of claim 16, further comprising a first flow meter configured to measure a first fluid flow rate through the first fluid path and a second flow meter configured to measure a second fluid flow rate through the second fluid path, wherein the control circuitry is configured to selectively control the first and second valves based on the first fluid flow rate and the second fluid flow rate.

18. The welding wire feeder of claim 17, wherein the control circuitry is configured to selectively control a first position of the first plunger and a second position of the second plunger via one or more control signals based on the first fluid flow rate, the second fluid flow rate, and a target mixture composition.

19. The welding wire feeder of claim 14, wherein the third valve is a one way check valve, the control circuitry being further configured to:
   close the fourth valve when mixing the fluids, so that fluid pressure in the first fluid path is sufficient to overcome a bias of the one way check valve, and
   open the fourth valve when providing fluid from the first fluid reservoir to the first welding tool, so that fluid pressure in the first fluid path is insufficient to overcome the bias of the one way check valve.

20. The welding wire feeder of claim 11, wherein the control circuitry is configured to:
   control the feed roller to feed the welding wire to the second welding tool, and
   control the second valve to provide a mixture of fluids from the first and second fluid reservoirs to the second welding tool, via the second fluid outlet, in response to receiving a signal indicating that the second welding tool is being used.

* * * * *